(12) United States Patent
de Mersseman et al.

(10) Patent No.: US 11,474,218 B2
(45) Date of Patent: Oct. 18, 2022

(54) SCANNING LIDAR SYSTEM AND METHOD WITH UNITARY OPTICAL ELEMENT

(71) Applicant: Veoneer US, LLC, Wilmington, DE (US)

(72) Inventors: Bernard de Mersseman, Andover, MA (US); Desmond Fleming, Groton, MA (US); Olov Von Hofsten, Stockholm (SE)

(73) Assignee: Veoneer US, LLC, Wilmington, DE (US)

( * ) Notice: Subject to any disclaimer, the term of this patent is extended or adjusted under 35 U.S.C. 154(b) by 656 days.

(21) Appl. No.: 16/511,432

(22) Filed: Jul. 15, 2019

(65) Prior Publication Data

US 2021/0018602 A1    Jan. 21, 2021

(51) Int. Cl.
*G01S 7/499* (2006.01)
*G02B 27/28* (2006.01)
(Continued)

(52) U.S. Cl.
CPC ............ *G01S 7/499* (2013.01); *G01S 7/4804* (2013.01); *G01S 7/4813* (2013.01); *G01S 7/497* (2013.01); *G02B 27/283* (2013.01); *G01S 17/931* (2020.01)

(58) Field of Classification Search
CPC ...... G01S 7/499; G01S 7/4804; G01S 7/4813; G01S 7/497; G01S 17/931; G02B 27/283
See application file for complete search history.

(56) References Cited

U.S. PATENT DOCUMENTS

| 3,712,985 A | 1/1973 | Swarner et al. |
| 3,898,656 A | 8/1975 | Jensen |

(Continued)

FOREIGN PATENT DOCUMENTS

| AT | 509180 B1 | 1/2016 |
| DE | 19757840 C1 | 9/1999 |

(Continued)

OTHER PUBLICATIONS

Communication from EP Application No. 18773034.6 dated Sep. 13, 2021.

(Continued)

*Primary Examiner* — David P Porta
*Assistant Examiner* — Fani Polyzos Boosalis
(74) *Attorney, Agent, or Firm* — Burns & Levinson LLP; Steven M. Mills

(57) ABSTRACT

A LiDAR apparatus includes a first substrate and a unitary optical element mounted thereon. The unitary optical element includes: (i) a fast axis collimator (FAC) lens receiving light from a laser diode source and generating therefrom a collimated light beam; (ii) a polarizing beam splitter optically coupled to the FAC lens, at least a portion of the collimated light beam passing through the polarizing beam splitter to a region being observed by the LiDAR apparatus; (iii) an aperture element optically coupled to the polarizing beam splitter; and (iv) an opaque coating formed on a back side of the aperture element, the opaque coating being patterned to provide a transparent aperture. At least of portion of light returning to the LiDAR apparatus from the region being observed is directed by the polarizing beam splitter, through the transparent aperture in the opaque coating on the aperture element, to an optical detector.

17 Claims, 13 Drawing Sheets

(51) Int. Cl.
  *G01S 7/481* (2006.01)
  *G01S 7/497* (2006.01)
  *G01S 7/48* (2006.01)
  *G01S 17/931* (2020.01)

(56) References Cited

U.S. PATENT DOCUMENTS

| | | | |
|---|---|---|---|
| 4,125,864 A | 11/1978 | Aughton | |
| 4,184,154 A | 1/1980 | Albanese et al. | |
| 4,362,361 A | 12/1982 | Campbell et al. | |
| 4,439,766 A | 3/1984 | Kobayashi et al. | |
| 4,765,715 A | 8/1988 | Matsudaira et al. | |
| 4,957,362 A | 9/1990 | Peterson | |
| 5,200,606 A | 4/1993 | Krasutsky et al. | |
| 5,210,586 A | 5/1993 | Grage et al. | |
| 5,274,379 A | 12/1993 | Carbonneau et al. | |
| 5,428,215 A | 6/1995 | Dubois et al. | |
| 5,604,695 A | 2/1997 | Cantin et al. | |
| 5,793,491 A | 8/1998 | Wangler et al. | |
| 5,889,490 A | 3/1999 | Wachter et al. | |
| 5,966,226 A | 10/1999 | Gerber | |
| 6,078,395 A | 6/2000 | Jourdain et al. | |
| 6,122,222 A | 9/2000 | Hossack | |
| 6,292,285 B1 | 9/2001 | Wang et al. | |
| 6,384,770 B1 | 5/2002 | de Gouy | |
| 6,437,854 B2 | 8/2002 | Hahlweg | |
| 6,556,282 B2 | 4/2003 | Jamieson et al. | |
| 6,559,932 B1 | 5/2003 | Halmos | |
| 7,202,941 B2 | 4/2007 | Munro | |
| 7,227,116 B2 | 6/2007 | Gleckler | |
| 7,272,271 B2 | 9/2007 | Kaplan et al. | |
| 7,440,084 B2 | 10/2008 | Kane | |
| 7,483,600 B2 | 1/2009 | Achiam et al. | |
| 7,489,865 B2 | 2/2009 | Varshneya et al. | |
| 7,544,945 B2 | 6/2009 | Tan et al. | |
| 7,570,347 B2 | 8/2009 | Ruff et al. | |
| 7,675,610 B2 | 3/2010 | Redman et al. | |
| 7,832,762 B2 | 11/2010 | Breed | |
| 8,044,999 B2 | 10/2011 | Mullen et al. | |
| 8,050,863 B2 | 11/2011 | Trepagnier et al. | |
| 8,134,637 B2 | 3/2012 | Rossbach et al. | |
| 8,223,215 B2 | 7/2012 | Oggier et al. | |
| 8,363,511 B2 | 1/2013 | Frank et al. | |
| 8,508,723 B2 | 8/2013 | Chang et al. | |
| 8,629,975 B1 | 1/2014 | Dierking et al. | |
| 8,742,325 B1 | 6/2014 | Droz et al. | |
| 8,836,761 B2 | 9/2014 | Wang et al. | |
| 8,836,922 B1 | 9/2014 | Pennecot | |
| 8,879,050 B2 | 11/2014 | Ko | |
| 9,007,569 B2 | 4/2015 | Amzajerdian et al. | |
| 9,063,549 B1 | 6/2015 | Pennecot et al. | |
| 9,086,273 B1 | 7/2015 | Gruver et al. | |
| 9,090,213 B2 | 7/2015 | Lawlor et al. | |
| 9,097,646 B1 | 8/2015 | Campbell et al. | |
| 9,140,792 B2 | 9/2015 | Zeng | |
| 9,157,790 B2 | 10/2015 | Shpunt et al. | |
| 9,267,787 B2 | 2/2016 | Shpunt et al. | |
| 9,285,477 B1 | 3/2016 | Smith et al. | |
| 9,575,162 B2 | 2/2017 | Owechko | |
| 9,618,742 B1 | 4/2017 | Droz et al. | |
| 9,651,417 B2 | 5/2017 | Shpunt et al. | |
| 9,658,322 B2 | 5/2017 | Lewis | |
| 9,696,427 B2 | 7/2017 | Wilson et al. | |
| 9,711,493 B2 | 7/2017 | Lin | |
| 9,753,351 B2 | 9/2017 | Eldada | |
| 9,823,351 B2 | 11/2017 | Haslim et al. | |
| 9,857,472 B2 | 1/2018 | Mheen et al. | |
| 9,869,754 B1 | 1/2018 | Campbell et al. | |
| 10,018,725 B2 | 7/2018 | Liu | |
| 10,018,726 B2 | 7/2018 | Hall et al. | |
| 10,024,655 B2 | 7/2018 | Raguin et al. | |
| 10,078,133 B2 | 9/2018 | Dussan | |
| 10,088,557 B2 | 10/2018 | Yeun | |
| 10,148,060 B2 | 12/2018 | Hong et al. | |
| 10,175,360 B2 | 1/2019 | Zweigle et al. | |
| 10,183,541 B2 | 1/2019 | Van Den Bossche et al. | |
| 10,408,924 B2 | 9/2019 | Mheen | |
| 10,411,524 B2 | 9/2019 | Widmer et al. | |
| 10,416,292 B2 | 9/2019 | de Mersseman et al. | |
| 10,473,767 B2 | 11/2019 | Xiang et al. | |
| 10,473,784 B2 | 11/2019 | Puglia | |
| 10,473,943 B1 | 11/2019 | Hughes | |
| 10,557,923 B2 | 2/2020 | Watnik et al. | |
| 10,558,044 B2 | 2/2020 | Pan | |
| 10,564,268 B2 | 2/2020 | Turbide et al. | |
| 10,578,724 B2 | 3/2020 | Droz et al. | |
| 10,678,117 B2 | 6/2020 | Shin et al. | |
| 10,775,508 B1 | 9/2020 | Rezk et al. | |
| 2001/0052872 A1 | 12/2001 | Hahlweg | |
| 2003/0043363 A1 | 3/2003 | Jamieson | |
| 2004/0028418 A1 | 2/2004 | Kaplan et al. | |
| 2004/0031906 A1 | 2/2004 | Glecker | |
| 2004/0135992 A1 | 7/2004 | Munro | |
| 2004/0155249 A1 | 8/2004 | Narui et al. | |
| 2005/0219506 A1 | 10/2005 | Okuda et al. | |
| 2006/0221250 A1 | 10/2006 | Rossbach et al. | |
| 2006/0232052 A1 | 10/2006 | Breed | |
| 2006/0239312 A1 | 10/2006 | Kewitsch et al. | |
| 2007/0140613 A1 | 6/2007 | Achiam et al. | |
| 2007/0181810 A1 | 8/2007 | Tan et al. | |
| 2007/0211786 A1 | 9/2007 | Shatill | |
| 2007/0219720 A1 | 9/2007 | Trepagnier et al. | |
| 2008/0088499 A1 | 4/2008 | Bonthron et al. | |
| 2008/0095121 A1 | 4/2008 | Shatill | |
| 2008/0100510 A1 | 5/2008 | Bonthron | |
| 2008/0219584 A1 | 9/2008 | Mullen et al. | |
| 2008/0246944 A1 | 10/2008 | Redman et al. | |
| 2009/0002680 A1 | 1/2009 | Ruff et al. | |
| 2009/0010644 A1 | 1/2009 | Varshneya et al. | |
| 2009/0190007 A1 | 7/2009 | Oggier et al. | |
| 2009/0251361 A1 | 10/2009 | Bensley | |
| 2010/0027602 A1 | 2/2010 | Abshire et al. | |
| 2010/0128109 A1 | 5/2010 | Banks | |
| 2010/0157280 A1 | 6/2010 | Kusevic et al. | |
| 2010/0182874 A1 | 7/2010 | Frank et al. | |
| 2012/0075422 A1 | 3/2012 | Wang et al. | |
| 2012/0182540 A1 | 7/2012 | Suzuki | |
| 2012/0206712 A1 | 8/2012 | Chang et al. | |
| 2012/0236379 A1 | 9/2012 | da Silva et al. | |
| 2012/0310516 A1 | 12/2012 | Zeng | |
| 2012/0310519 A1 | 12/2012 | Lawlor et al. | |
| 2013/0088726 A1 | 4/2013 | Goyal et al. | |
| 2013/0093584 A1 | 4/2013 | Schumacher | |
| 2013/0120760 A1 | 5/2013 | Raguin et al. | |
| 2013/0166113 A1 | 6/2013 | Dakin et al. | |
| 2013/0206967 A1 | 8/2013 | Shpunt et al. | |
| 2013/0207970 A1 | 8/2013 | Shpunt et al. | |
| 2013/0222786 A1 | 8/2013 | Hanson et al. | |
| 2013/0250276 A1 | 9/2013 | Chang et al. | |
| 2014/0036252 A1 | 2/2014 | Amzajerdian et al. | |
| 2014/0049609 A1 | 2/2014 | Wilson | |
| 2014/0152975 A1 | 6/2014 | Ko | |
| 2014/0168631 A1 | 6/2014 | Haslim | |
| 2014/0233942 A1 | 8/2014 | Kanter | |
| 2014/0313519 A1 | 10/2014 | Shpunt et al. | |
| 2015/0009485 A1 | 1/2015 | Mheen | |
| 2015/0055117 A1 | 2/2015 | Pennecot et al. | |
| 2015/0234308 A1 | 8/2015 | Lim et al. | |
| 2015/0260843 A1 | 9/2015 | Lewis | |
| 2015/0301162 A1 | 10/2015 | Kim | |
| 2015/0371074 A1 | 12/2015 | Lin | |
| 2015/0378011 A1 | 12/2015 | Owechko | |
| 2016/0047895 A1 | 2/2016 | Dussan | |
| 2016/0047896 A1 | 2/2016 | Dussan | |
| 2016/0047903 A1 | 2/2016 | Dussan | |
| 2016/0138944 A1 | 5/2016 | Lee et al. | |
| 2016/0178749 A1 | 6/2016 | Lin et al. | |
| 2016/0200161 A1 | 7/2016 | Van Den Bossche et al. | |
| 2016/0245902 A1 | 8/2016 | Watnik et al. | |
| 2016/0280229 A1 | 9/2016 | Kasahara | |
| 2016/0291160 A1 | 10/2016 | Zweigle et al. | |
| 2016/0357187 A1 | 12/2016 | Ansari | |
| 2016/0363669 A1 | 12/2016 | Liu | |
| 2016/0380488 A1 | 12/2016 | Widmer et al. | |

(56) References Cited

U.S. PATENT DOCUMENTS

| | | |
|---|---|---|
| 2017/0023678 A1 | 1/2017 | Pink et al. |
| 2017/0090013 A1 | 3/2017 | Paradie et al. |
| 2017/0102457 A1 | 4/2017 | Li |
| 2017/0199273 A1 | 7/2017 | Morikawa et al. |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0310948 A1 | 10/2017 | Pei |
| 2017/0329010 A1 | 11/2017 | Warke et al. |
| 2017/0329011 A1 | 11/2017 | Warke et al. |
| 2018/0052378 A1 | 2/2018 | Shin et al. |
| 2018/0113193 A1 | 4/2018 | Huemer |
| 2018/0128903 A1 | 5/2018 | Chang |
| 2018/0136328 A1 | 5/2018 | Moss |
| 2018/0143309 A1 | 5/2018 | Pennecot et al. |
| 2018/0180718 A1 | 6/2018 | Lin |
| 2018/0224529 A1 | 8/2018 | Wolf et al. |
| 2018/0241477 A1 | 8/2018 | Turbide et al. |
| 2018/0284237 A1 | 10/2018 | Campbell |
| 2018/0284282 A1 | 10/2018 | Hong et al. |
| 2018/0284286 A1 | 10/2018 | Eichenholz |
| 2018/0286909 A1* | 10/2018 | Eichenholz ............ G01S 17/10 |
| 2018/0306913 A1 | 10/2018 | Bartels |
| 2018/0341009 A1 | 11/2018 | Niclass et al. |
| 2018/0364334 A1 | 12/2018 | Xiang et al. |
| 2018/0372870 A1 | 12/2018 | Puglia |
| 2019/0018143 A1 | 1/2019 | Thayer et al. |
| 2019/0101644 A1 | 4/2019 | DeMersseman et al. |
| 2019/0123508 A1 | 4/2019 | Hong et al. |
| 2019/0129009 A1 | 5/2019 | Eichenholz et al. |
| 2019/0139951 A1 | 5/2019 | T'Ng et al. |
| 2019/0146060 A1 | 5/2019 | Qiu et al. |
| 2019/0195990 A1 | 6/2019 | Shand |
| 2019/0235064 A1 | 8/2019 | Droz et al. |
| 2020/0081129 A1 | 3/2020 | de Mersseman |
| 2020/0088847 A1 | 3/2020 | DeMersseman et al. |
| 2020/0249354 A1 | 8/2020 | Yeruhami et al. |
| 2020/0341120 A1 | 10/2020 | Ahn |
| 2020/0341121 A1 | 10/2020 | Ahn |
| 2021/0018602 A1 | 1/2021 | de Mersseman et al. |

FOREIGN PATENT DOCUMENTS

| | | |
|---|---|---|
| DE | 102004033944 A | 2/2006 |
| DE | 102006031114 B4 | 7/2008 |
| DE | 102008045387 A1 | 3/2010 |
| DE | 102014218957 A1 | 3/2016 |
| DE | 102015217908 A | 3/2017 |
| EP | 0112188 B1 | 6/1987 |
| EP | 0578129 A2 | 1/1994 |
| EP | 2696166 A3 | 12/2014 |
| EP | 2824418 A1 | 1/2015 |
| EP | 3203259 A1 | 8/2017 |
| EP | 3457080 A1 | 3/2019 |
| EP | 3147685 B1 | 1/2020 |
| WO | 1994019705 | 9/1994 |
| WO | 2008008970 A3 | 1/2008 |
| WO | 2015014556 A3 | 2/2015 |
| WO | 2016072483 A1 | 5/2016 |
| WO | 2016097409 A3 | 6/2016 |
| WO | 2016204139 A1 | 12/2016 |
| WO | 2019050643 A1 | 3/2019 |
| WO | 2019099166 A1 | 5/2019 |

OTHER PUBLICATIONS

Kasturi et al., UAV-Bome LiDAR with MEMS Mirror Based Scanning Capability; SPIE Defense and Commercial Sensing Conference 2016, Baltimore, MD; 10 pages, 2016.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_lasersensors_in_self-driving_carsjsp.
Hewlett-Packard Application Note 77-4, Swept-Frequency Group Delay Measurements, Hewlett-Packard Co., September, 7 pages, 1968.
Kravitz et al., High-Resolution Low-Sidelobe Laser Ranging Based on Incoherent Pulse Compression, IEEE Jhotonic,s Technology Letters, vol. 24, No. 23, pp. 2119-2121, 2012.
Journet et al., A Low-Cost Laser Range Finder Based on an FMCW-like Method, IEEE Transactions on nstrumentation and Measurement, vol. 49, No. 4, pp. 840-843, 2000.
Campbell et al., Advanced Sine Wave Modulation of Continuous Wave Laser System for Atmospheric $CO_2$ Differential Absorption Measurements; NASA Langley Research Center, 32 pages, 2018.
Levanon et al., Non-coherent Pulse Compression-Aperiodic and Periodic Waveforms; The Institution of Engineering and Technology, 9 pages, 2015.
Peer et al., Compression Waveforms for Non-Coherent Radar, Tel Aviv University, 6 pages, 2018.
Li, Time-of-Flight Camera—An Introduction, Technical White Paper, SLOA190B, Texas Instruments, 10 pages, 2014.
Pierrottet et al., Linear FMCW Laser Radar for Precision Range and Vector Velocity Measurements, Coherent Applications, Inc., NASA Langley Research Center, 9 pages, 2018.
Kahn, Modulation and Detection Techniques for Optical Communication Systems, Stanford University, Department of Electrical Engineering, 3 pages, 2006.
Niclass et al., Development of Automotive LIDAR, Electronics and Communications in Japan, vol. 98, No. 5, 6 pages, 2015.
Su et al., 2-D FFT and Time-Frequency Analysis Techniques for Multi-Target Recognition of FMCW Radar Signal, Proceedings of the Asia-Pacific Microwave Conference 2011, pp. 1390-1393.
Wojtkiewicz et al., Two-Dimensional Signal Processing in FMCW Radars, Instytut Podstaw Elektroniki Politechnika Warszawska, Warszawa, 6 pages, 2018.
Winkler, Range Doppler Detection for Automotive FMCW Radars, Proceedings of the 4th European Radar Conference, Munich Germany, 4 pages, 2007.
Li et al., Investigation of Beam Steering Performances in Rotation Risley-Prism Scanner, Optics Express, vol. 24, No. 12, 11 pages, 2016.
THORLABS Application Note, Risley Prism Scanner, 33 pages, 2018.
Simpson et al., Intensity-Modulated, Stepped Frequency CW Lidar for Distributed Aerosol and Hard Target Measurements, Applied Optics, vol. 44, No. 33, pp. 7210-7217, 2005.
Skolnik, Introduction to Radar Systems, 3rd Edition, McGraw-Hill, New York, NY 2001, pp. 45-48.
Wang et al., Range-Doppler image processing in linear FMCW Radar and FPGA Based Real-Time Implementation, Journal of Communication and Computer, vol. 6, No. 4, 2009.
International Search Report and Written Opinion for International Application No. PCT/US2018/057727 dated Jan. 28, 2019.
International Search Report and Written Opinion for International Application No. PCT/US2018/052837 dated Jan. 24, 2019.
International Search Report and Written Opinion for International Application No. PCT/US2017/033263 dated Aug. 29, 2017.
International Search Report and Written Opinion for International Application No. PCT/US2018/048869 dated Nov. 8, 2018.

(56) References Cited

OTHER PUBLICATIONS

International Search Report and Written Opinion for International Application No. PCT/US2018/051281 dated Nov. 22, 2018.
International Search Report and Written Opinion for International Application No. PCT/US2018/054992 dated Dec. 11, 2018.
International Search Report and Written Opinion for International Application No. PCT/US2018/049038 dated Dec. 12, 2018.
International Search Report and Written Opinion for International Application No. PCT/US2017/033265 dated Sep. 1, 2017.
International Search Report and Written Opinion for International Application No. PCT/US2017/033271 dated Sep. 1, 2017.
Invitation to Pay Additional Fees for International Application No. PCT/US2018/052849 dated Mar. 8, 2019.
http://www.advancedscientificconcepts.com/products/overview.html.
Roncat, Andreas, The Geometry of Airborne Laser Scanning in a Kinematical Framework, Oct. 19, 2016, www.researchgate.net/profile/Andreas_Roncat/publication/310843362_The_Geometry_of_Airborne_LaserScanningin_a_Kinematical_Frameworldinks/5839add708ae3a74b49ea03b1The-Geometry-of-Airborne-Laser-Scanning-in-a-Kinematical-Framework.pdf.
International Search Report and Written Opinion for International Application No. PCT/US2020/064474, dated Apr. 1, 2021.
International Search Report and Written Opinion for International Application No. PCT/US2018/057676, dated Jan. 23, 2019.
International Search Report and Written Opinion for International Application No. PCT/US2018/052849, dated May 6, 2019.
International Search Report and Written Opinion for International Application No. PCT/US2019/046800, dated Nov. 25, 2019.
Church et al., "Evaluation of a steerable 3D laser scanner using a double Risley prism pair," SPIE Paper.
Luhmann, "A historical review on panorama photogrammetry," http://www.researchgate.net/publication/228766550.
International Search Report and Written Opinion for International Application No. PCT/US2020/039760, dated Sep. 18, 2020.

* cited by examiner

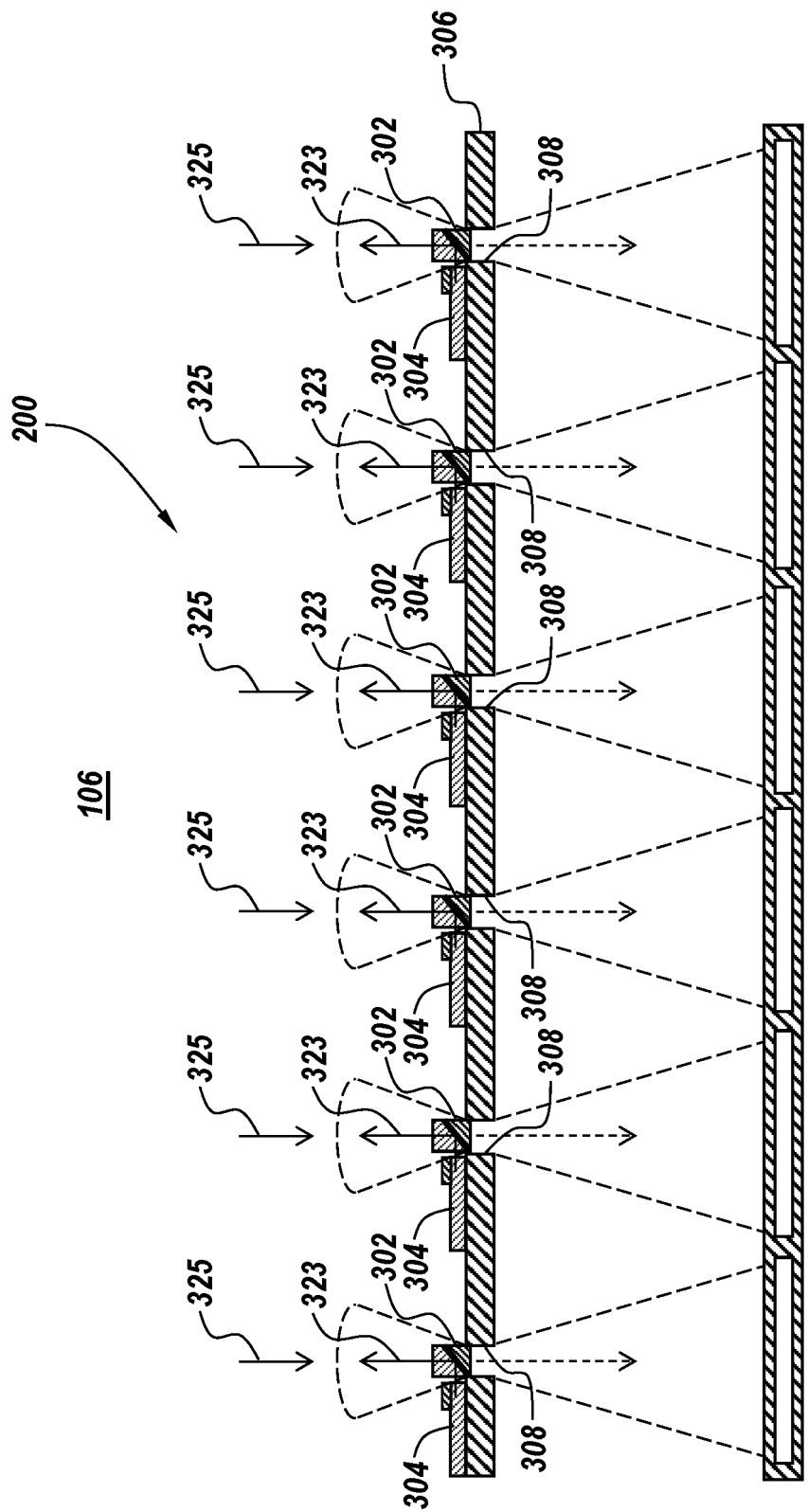

SCANNING LIDAR SYSTEM AND METHOD WITH UNITARY OPTICAL ELEMENT

BACKGROUND

1. Technical Field

The present disclosure is related to LiDAR detection systems and, in particular, to a LiDAR system with integrated unitary optical components for efficient control of optical alignment of the detection system.

2. Discussion of Related Art

A typical LiDAR detection system includes a source of optical radiation, for example, a laser, which emits light into a region. An optical detection device, which can include one or more optical detectors and/or an array of optical detectors, receives reflected light from the region and converts the reflected light to electrical signals. A processing device processes the electrical signals to identify and generate information associated with one or more target objects in the region. This information can include, for example, bearing, range, velocity, and/or reflectivity information for each target object.

One very important application for LiDAR detection systems is in automobiles, in which object detections can facilitate various features, such as parking assistance features, cross traffic warning features, blind spot detection features, autonomous vehicle operation, and many other features. In automotive LiDAR detection systems, it is important that the system be optically aligned to close tolerances to ensure high optical performance to eliminate missed target detections as well as false indications of detections. Alignment of the optical components in a LiDAR system can be a costly and time consuming task.

SUMMARY

According to one aspect, a LiDAR apparatus is provided. The LiDAR apparatus includes a first substrate and a unitary optical element mounted on the first substrate. The unitary optical element comprises: a fast axis collimator (FAC) lens receiving light from a laser diode source and generating therefrom a collimated light beam; a polarizing beam splitter optically coupled to the FAC lens, at least a portion of the collimated light beam passing through the polarizing beam splitter to a region being observed by the LiDAR apparatus; an aperture element optically coupled to the polarizing beam splitter; and an opaque coating formed on a back side of the aperture element, the opaque coating being patterned to provide a transparent aperture. At least of portion of light returning to the LiDAR apparatus from the region being observed is directed by the polarizing beam splitter, through the transparent aperture in the opaque coating on the aperture element, to an optical detector.

In some exemplary embodiments, the LiDAR apparatus further comprises a second substrate in fixed spatial relation to the first substrate; wherein, the optical detector is mounted on the second substrate. The first and second substrates can be held in stationary spatial relation with respect to each other by a supporting frame. The first and second substrates can be held in stationary spatial relation substantially perpendicular to each other by a supporting frame.

In some exemplary embodiments, the unitary optical element further comprises a quarter wave plate optically coupled to the polarizing beam splitter between the polarizing beam splitter and the region being observed.

In some exemplary embodiments, the unitary optical element is a one-piece precision glass optical element.

In some exemplary embodiments, the laser diode source is part of the unitary optical element.

According to one aspect, a LiDAR apparatus is provided. The LiDAR apparatus includes a substrate; a laser diode on a surface of the substrate for outputting light; a fast axis collimator (FAC) lens on the surface of the substrate for receiving the light and generating therefrom a collimated light beam; a polarizing beam splitter optically coupled to the FAC lens for receiving the collimated light beam, at least a portion of the collimated light beam passing through the polarizing beam splitter to a region being observed by the LiDAR apparatus; an aperture element optically coupled to the polarizing beam splitter; an opaque coating formed on a back side of the aperture element, the opaque coating being patterned to provide a transparent aperture; a prism on the surface of the substrate for receiving light from the transparent aperture in the opaque coating on the aperture element and directing the received light from the transparent aperture in the opaque coating on the aperture element in a direction toward the surface of the substrate; and an optical detector optically coupled to the prism. At least of portion of light returning to the LiDAR apparatus from the region being observed is directed by the polarizing beam splitter, through the transparent aperture in the opaque coating on the aperture element, through the prism to the optical detector.

In some exemplary embodiments, the optical detector is on the surface of the substrate.

In some exemplary embodiments, the prism is a 45-degree prism.

In some exemplary embodiments, the FAC lens, the polarizing beam splitter, and the aperture element are formed as a unitary optical element on the surface of the substrate. The unitary optical element can be a one-piece precision glass optical element. The prism can also be formed as part of the unitary optical element. The laser diode can also be formed as part of the unitary optical element.

In some exemplary embodiments, the LiDAR apparatus further comprises a quarter wave plate optically coupled to the polarizing beam splitter between the polarizing beam splitter and the region being observed. The quarter wave plate, the FAC lens, the polarizing beam splitter, and the aperture element can be formed as a unitary optical element of the surface of the substrate. The unitary optical element can be a one-piece precision glass optical element.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 4A and 4B include schematic diagrams illustrating portions of a scanning LiDAR system in which a coaxial configuration is implemented, according to some exemplary embodiments.

DETAILED DESCRIPTION

Figure 1:
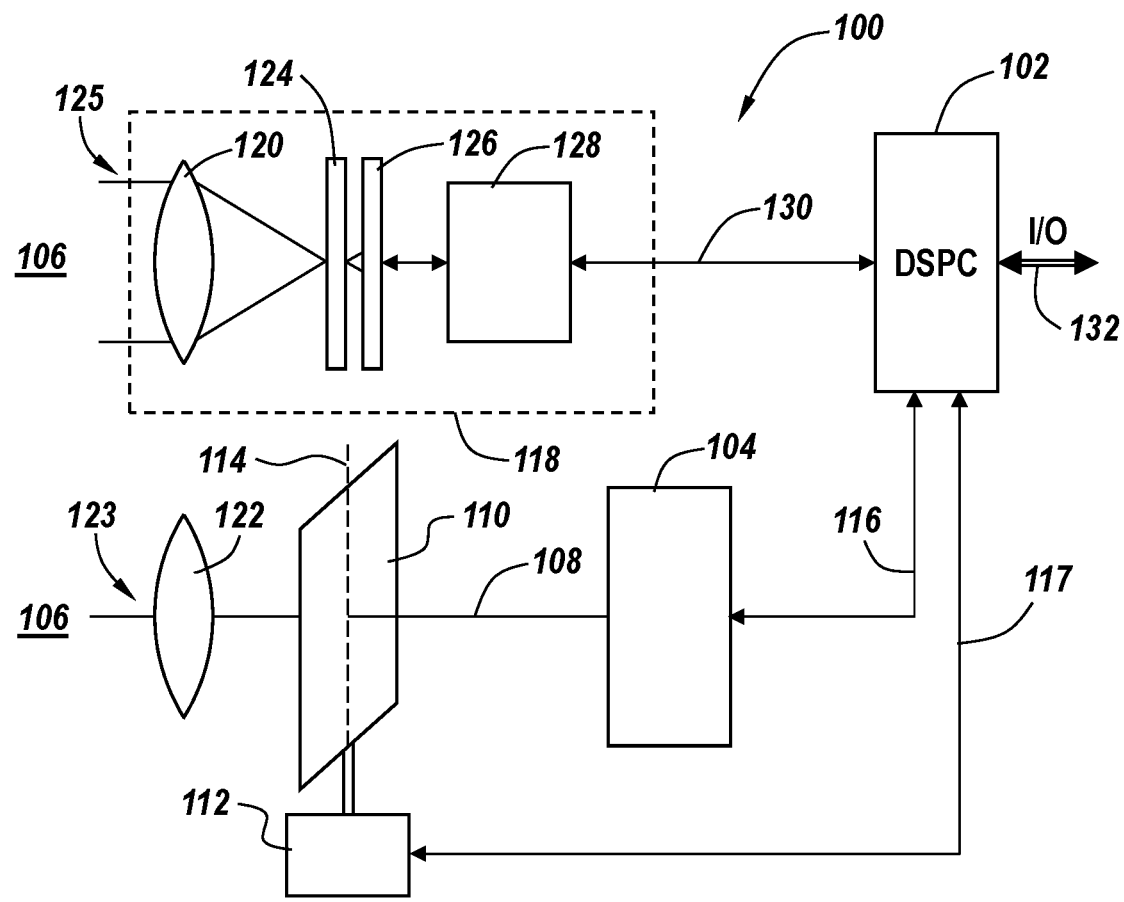
FIG. 1 includes a schematic functional block diagram of a scanning LiDAR system, according to some exemplary embodiments.

FIG. 1 includes a schematic functional block diagram of a scanning LiDAR system 100, according to exemplary embodiments. Referring to FIG. 1, system 100 includes a digital signal processor and controller (DSPC) 102, which performs all of the control and signal processing required to carry out the LiDAR target object detection functionality of system 100. An optical source 104, such as a laser, operates under control of DSPC 102 via one or more control signals 116 to generate the one or more optical signals transmitted into a region 106 being analyzed. Optical source 104 can include a single laser, or optical source 104 can include multiple lasers, which can be arranged in a one-dimensional or two-dimensional array. One or more optical signals 108 from source 104 impinge on scanning mirror 110, which can be a microelectromechanical system (MEMS) scanning mirror. Scanning mirror 110 is rotatable about an axis 114 by an actuator 112, which operates under control of one or more control signals 117 provided by DSPC 102 to control the rotation angle of scanning mirror 110, such that the one or more output optical signals are scanned at various angles into region 106. The output optical signals pass through a lens or glass plate 122, which generates one or more collimated optical signals 123 which are scanned across region 106.

Returning optical signals 125 are received from region 106 at receive subsystem 118. Receive subsystem 118 includes a lens 120 which receives and focuses light 125 returning from region 106. According to some exemplary embodiments, mask 124 is located at the focal plane of lens 120, such that the returning light is focused at mask 124. Light passing through mask 124 impinges on optical detector or detector array 126. Detector array 126 converts the received optical signals to electrical signals, and a processor 128 generates digital signals based on the electrical signals and transmits the digital signals 130 to DSPC 102 for processing to develop target object identification, tracking and/or other operations. Reports of detections to one or more user interfaces or memory or other functions can be carried out via I/O port 132.

Figure 2A:
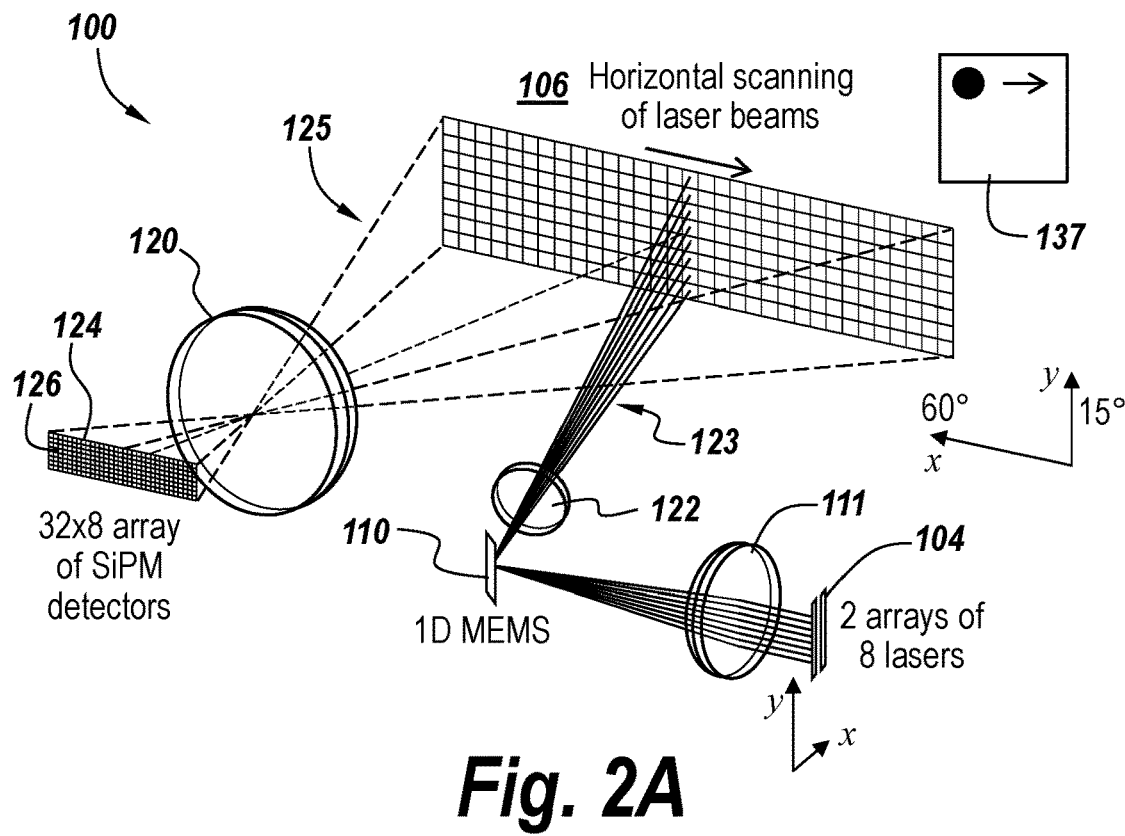
FIGS. 2A and 2B include schematic functional diagrams illustrating portions of the scanning LiDAR system of FIG. 1, according to some exemplary embodiments.
Figure 2B:
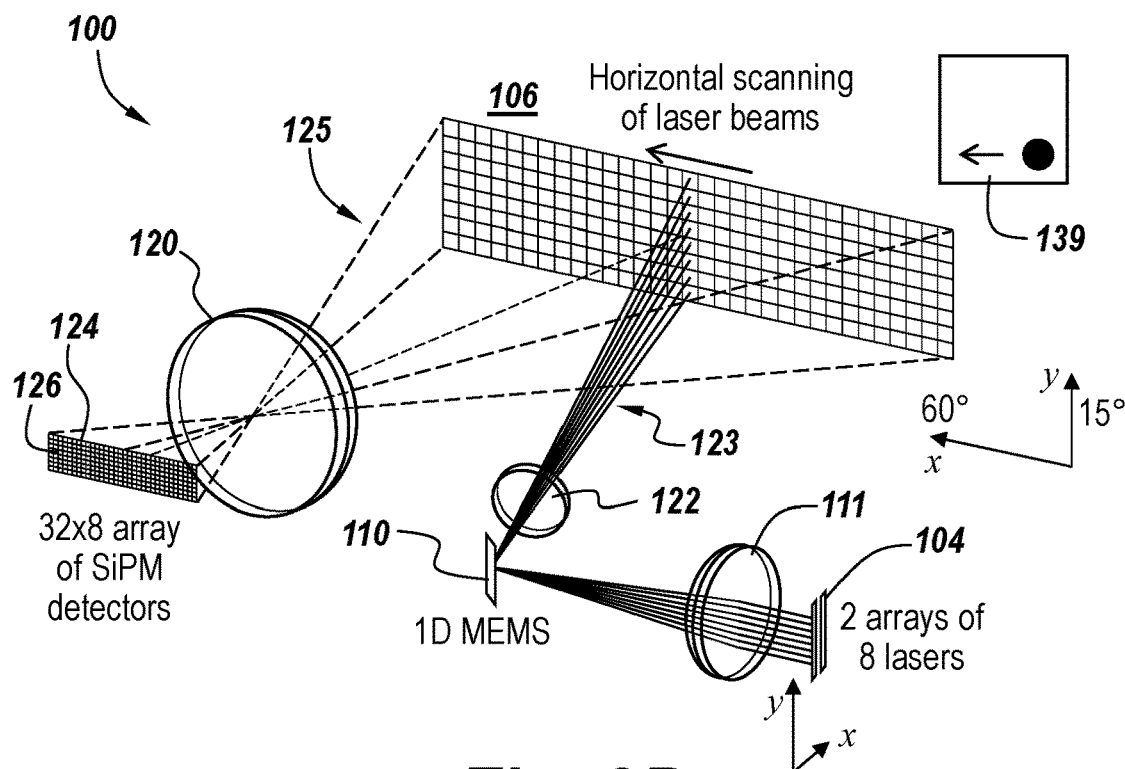

FIGS. 2A and 2B include schematic functional diagrams illustrating portions of scanning LiDAR system 100 of FIG. 1, according to exemplary embodiments. FIGS. 2A and 2B illustrate scanning of the transmitted optical signals into region 106 and reception of returning optical signals for a first angular direction of scanning of scanning mirror 110 about axis 114 and a second opposite angular scanning direction of scanning mirror 110 about axis 114, respectively.

Referring to FIGS. 1, 2A and 2B, in some exemplary embodiments, optical source 104 can include one or more linear arrays of lasers disposed along an axis. That is, each linear array of lasers can include a plurality of lasers disposed along a vertical axis, i.e., a y-axis. In the exemplary embodiment illustrated in FIGS. 2A and 2B, two linear arrays are disposed along parallel axes in the y-axis direction. The axes can be displaced along a horizontal axis, i.e., an x-axis. Also, the two linear laser arrays can be displaced also in the vertical direction (y-axis) in order to generate different elevation angles. Alternatively, the linear laser arrays could be rotated around the x-axis in order to generate different elevation angles. Thus, as illustrated in FIGS. 2A and 2B, the two parallel linear laser arrays create a two-dimensional array of laser outputs transmitted orthogonal to the x-y plane. In some particular exemplary embodiments, each of two linear arrays includes 8 lasers disposed along the y-axis, for a total of 16 lasers in the two-dimensional array. It will be understood that any number of lasers can be used, in accordance with the present embodiments. For example, in some particular exemplary embodiments, two linear arrays of 11 lasers, i.e., a total of 22 lasers, are used.

Continuing to refer to FIGS. 1, 2A and 2B, in some exemplary embodiments, the optical output signals from the laser array in source 104 are focused by a lens 111 onto MEMS scanning mirror 110. The optical signals are reflected from scanning mirror 110 through glass plate or lens 122, which generates the substantially mutually parallel collimated optical output signals 123. Controlled rotation of scanning mirror 110 via actuator 112 and DSPC 102 scans the collimated optical output signals 123 over region 106. Output signals or beams 123 constitute a fan of beams 123, where each beam is collimated. In some particular exemplary embodiments, the fan angle can be 15° to 22°. In some alternative embodiments, beams 123 are substantially mutually parallel. Light 125 returning from region 106, for example, light reflected from one or more target objects, is received at lens 120 of receive subsystem 118. Lens 120 focuses the returning light 125 onto mask 124, which is positioned in front of optical detector array 126. Thus, in the particular illustrated exemplary embodiments, detectors are arranged to provide a focal plane detector. Detector array 126 converts the received optical signals to electrical signals, and processor 128 generates digital signals based on the electrical signals and transmits the digital signals 130 to DSPC 102 for processing to develop target object identification, tracking and/or other operations. Reports of detections to one or more user interfaces or memory or other functions can be carried out via I/O port 132.

Thus, as illustrated in FIGS. 2A and 2B, in some particular exemplary embodiments, two arrays of 1×8 lasers are used to generate 16 individual laser beams, each beam with a nominal divergence of <0.1°. The vertical divergence of the group of 8 beams is nominally approximately 15°. Scanning mirror 110 is controlled to scan across a nominal range of approximately 60°, i.e., ±30° from its centered position. These angular limits are illustrated in FIGS. 2A and 2B in the diagrams of the x-y plane. FIG. 2A illustrates the case in which the output optical signals 123 are scanned in a first direction (to the right in FIG. 2A) via angular rotation of scanning mirror 110 in a first angular direction, and FIG. 2B illustrates the case in which the output signals 123 are scanned in a second direction (to the right in FIG. 2B) via angular rotation of scanning mirror 110 in a second angular direction. The resulting returning optical signals are scanned across the columns of the 32×8 detector array 126 illuminating pixels in the array in a predetermined order determined by the scanning of the output optical signals 123 into region 106, as illustrated in the schematic illustrations of pixel illumination scanning 137 and 139 in FIGS. 2A and 2B, respectively. It will be understood that all of these parameters are exemplary nominal values. According to the present disclosure, any number of lasers can be used, having a group beam divergence of greater than or less than 15°, and the angular scanning limits can be greater than or less than ±30° from the centered position of scanning mirror 110.

Figure 3:
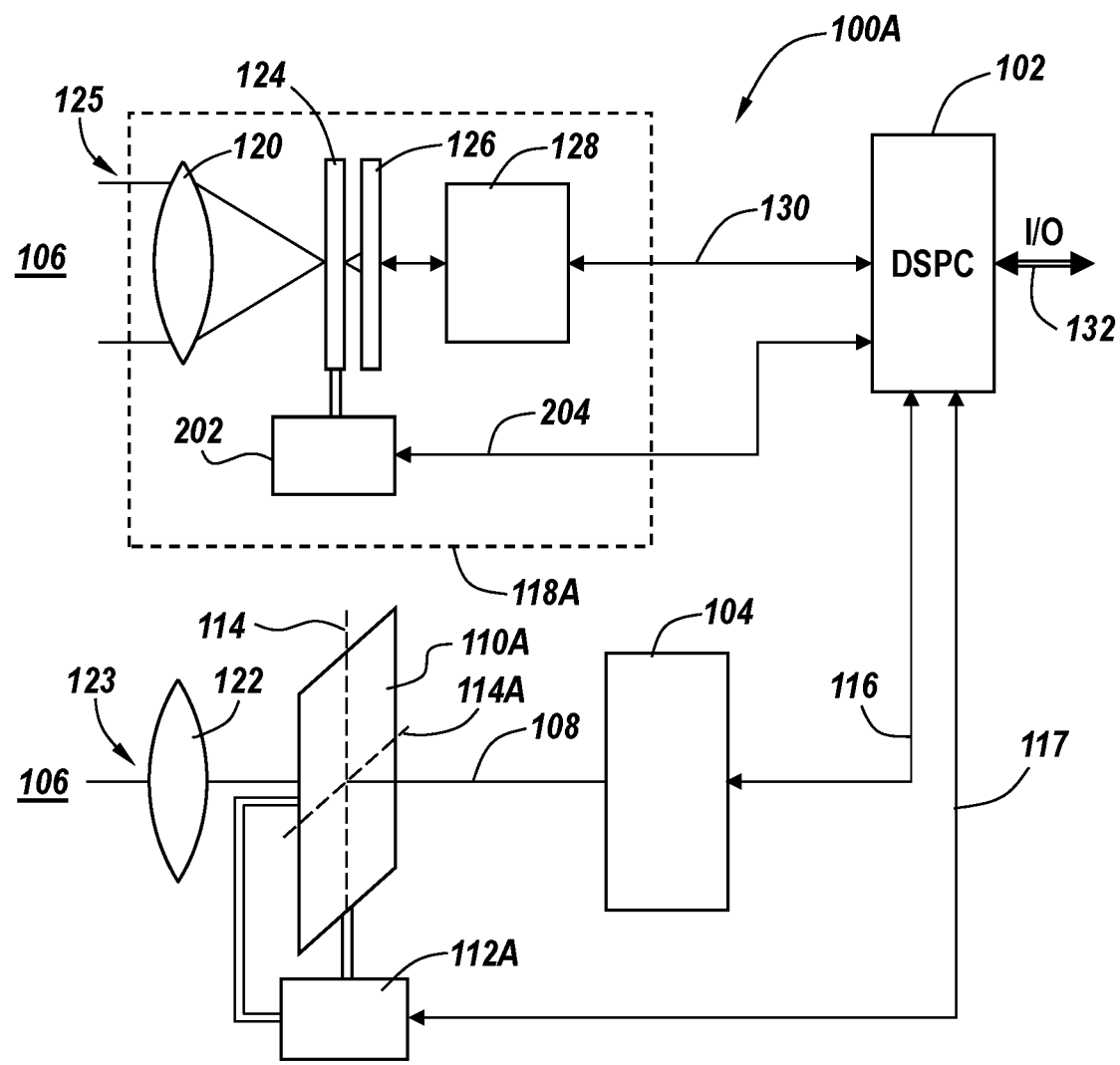
FIG. 3 includes a schematic functional block diagram of a scanning LiDAR system, in which horizontal and vertical scanning are performed, according to exemplary embodiments.

In some embodiments, in addition to horizontal scanning as described above in detail, scanning can also be carried out vertically. The vertical scanning can be performed in order to increase vertical resolution. FIG. 3 includes a schematic functional block diagram of a scanning LiDAR system 100A, in which horizontal and vertical scanning are performed, according to exemplary embodiments. In FIG. 3, elements that are substantially the same as those in FIGS. 1, 2A and 2B are identified by the same reference numerals. Referring to FIG. 3, in this embodiment, actuator 112A, in addition to initiating and controlling horizontal scanning of scanning mirror 110A about vertical axis 114, initiates and controls vertical scanning of scanning mirror 110A about horizontal axis 114A. In this alternative embodiment, mask 124 is also moved vertically alternately up and down in synchronization with the vertical scanning of scanning mirror 110A. Vertical movement of mask 124 is initiated by a mechanical actuation device, such as a piezoelectric actuator 202, in synchronization with scanning of scanning mirror 110A, such that alignment of mask 124 with returning light 125 is maintained. This synchronization is accomplished via interface 204 with DSPC 102.

Figure 4A:
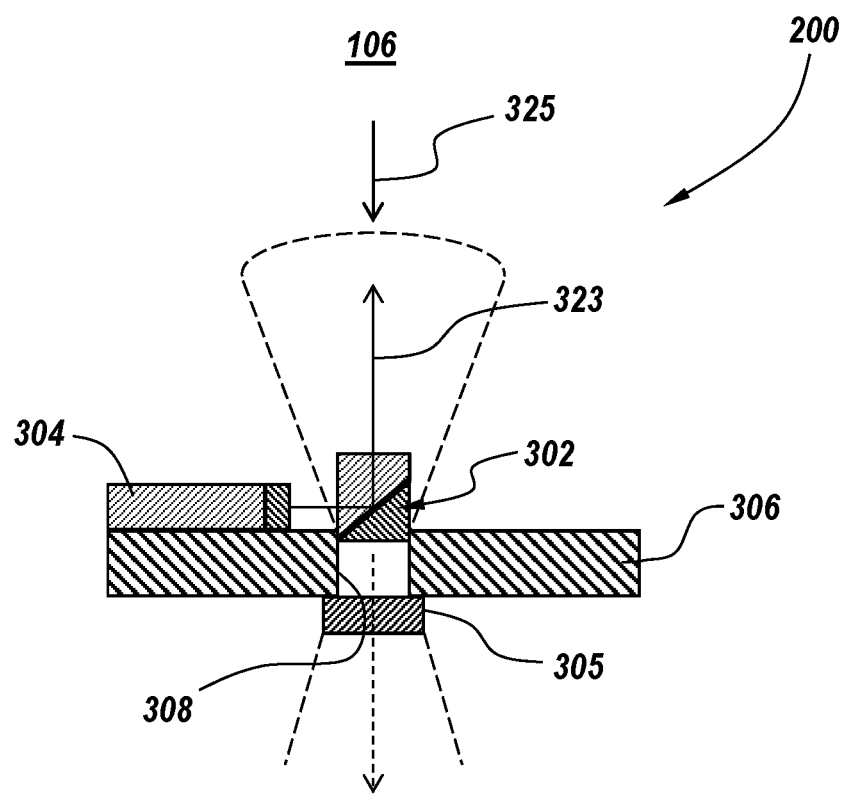

FIGS. 4A and 4B include schematic diagrams illustrating portions of a scanning LiDAR system 200 in which a coaxial configuration is implemented, according to some exemplary embodiments. FIG. 4A illustrates a single coaxial configuration, and FIG. 4B illustrates multiple coaxial configurations in parallel. Referring to FIGS. 4A and 4B, a laser light source 304 integrated on or in a substrate 306 generates an output beam of light. The output beam is reflected by a polarizing beam splitting cube 302 such that output signals 323 are transmitted into region 106. Returning light signals 325 from region 106 are transmitted through beam splitting cube 302, through an opening 308 in substrate 306. The light may pass through an optional bandpass filter 305, which further reduces the ambient light. In some exemplary embodiments, bandpass filter 305 is characterized by a drift in its wavelength pass band which is dependent on temperature. Laser light source 304 can also have a temperature-dependent drift in wavelength of its output. In some exemplary embodiments, the temperature drift of laser light source 304 and that of bandpass filter 305 are matched, such that temperature effects on operation of the overall system are substantially reduced.

Figure 5A:
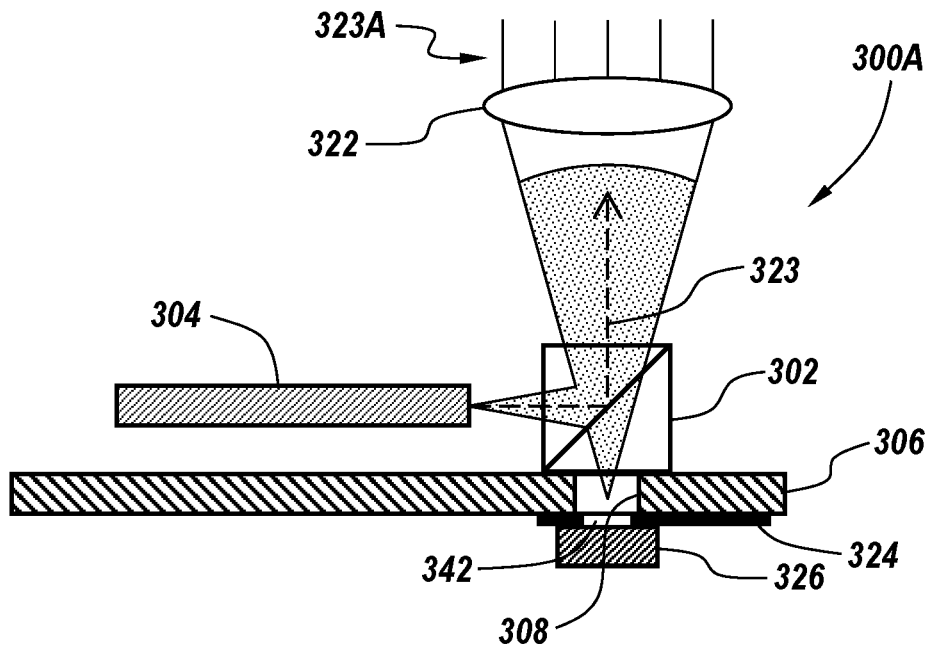
FIGS. 5A and 5B include schematic diagrams illustrating portions of scanning LiDAR systems, in which a coaxial configuration is implemented, according to some exemplary embodiments.
Figure 5B:
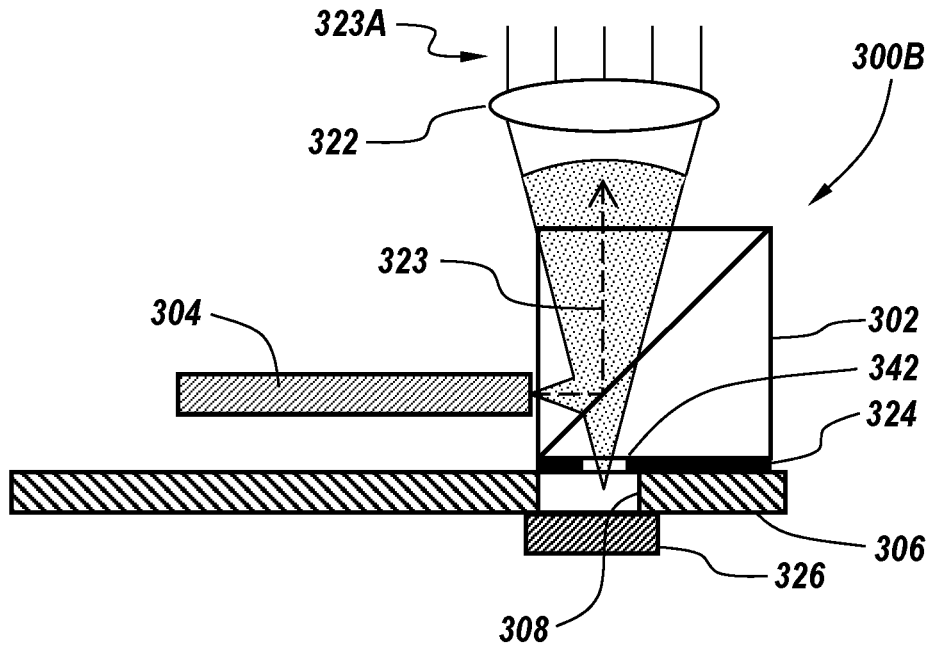

FIGS. 5A and 5B include schematic diagrams illustrating portions of scanning LiDAR systems 300A and 300B, respectively, in which a coaxial configuration is implemented, according to some exemplary embodiments. The primary difference between systems 300A, 300B of FIGS. 5A and 5B is that, in system 300A, mask 324 is under substrate 306, and, in system 300B, mask 324 is at the top side of substrate 306. In both systems 300A and 300B, incoming light from polarizing beam splitting cube 302 passes through slits, openings or apertures 342 in mask 324 and impinges on detector 326. In the embodiments of FIGS. 5A and 5B, lens 322 generates the substantially mutually parallel collimated optical output signals 323A. Controlled rotation of the scanning mirror scans the substantially mutually parallel collimated optical output signals 323A over the region being analyzed.

It should be noted that polarizing beam splitting cube 302 in the embodiments described above in detail in connection with FIGS. 4A, 4B, 5A and 5B need not be a cube. In alternative embodiments, polarizing beam splitting cube 302 can be replaced with a polarizing beam splitting plate tilted at an appropriate angle with respect to the optical paths of the respective systems.

Figure 6A:
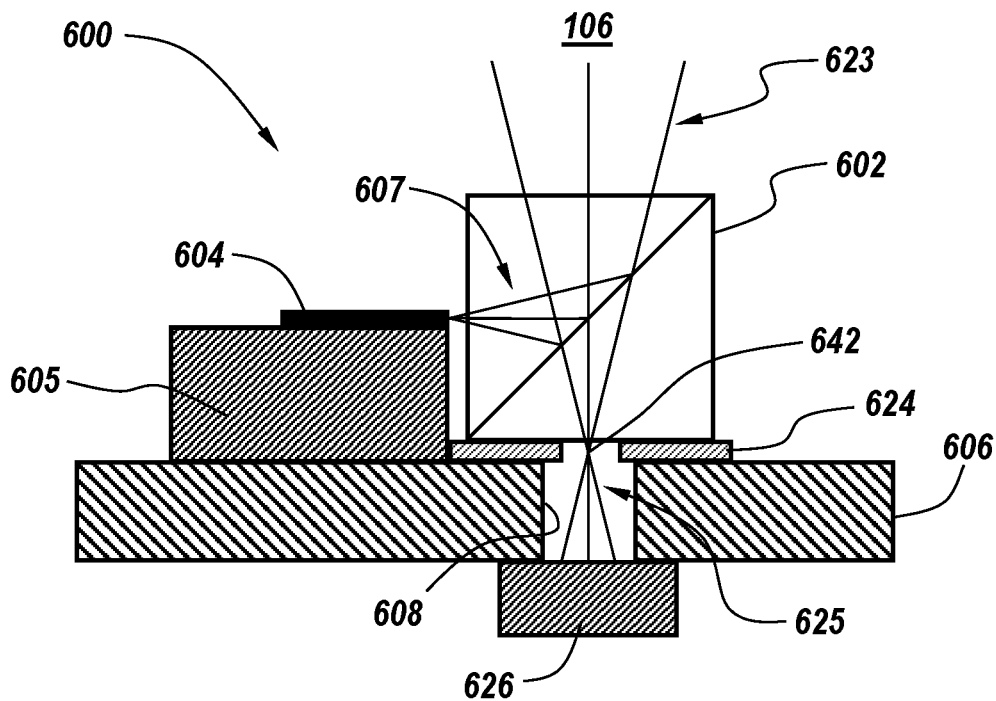
FIGS. 6A and 6B include schematic cross-sectional diagrams which illustrate two configurations of coaxial scanning LiDAR systems, in which discrete lasers and discrete detectors are used, according to some exemplary embodiments.
Figure 6B:
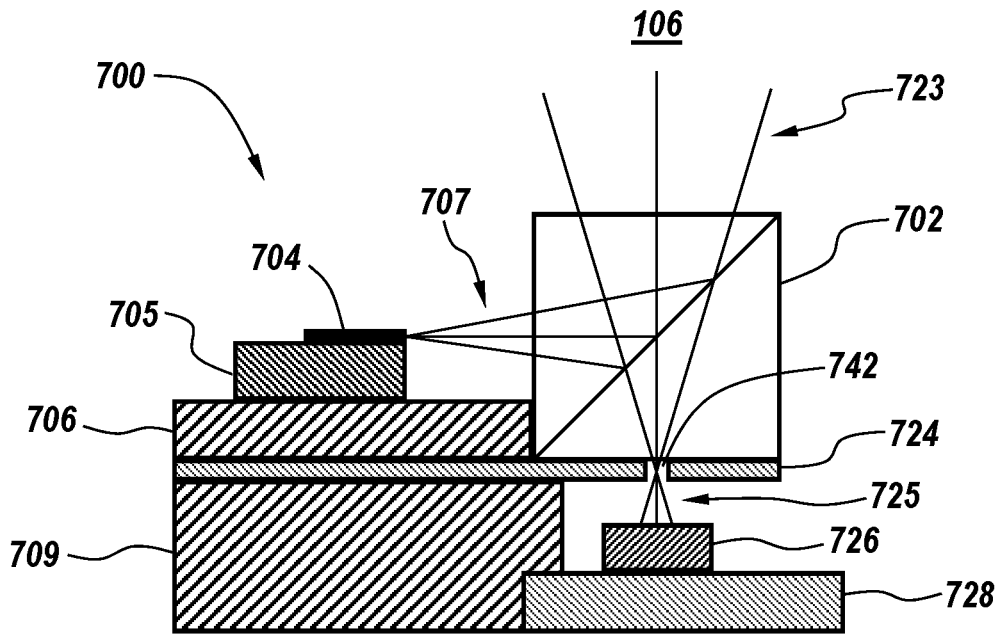

FIGS. 6A and 6B include schematic cross-sectional diagrams which illustrate two configurations of coaxial scanning LiDAR systems 600 and 700, respectively, in which discrete lasers and discrete detectors are used, according to some exemplary embodiments. Referring to FIG. 6A, a laser light source 604 is integrated on or over a substrate 606, with a layer of inert spacing material 605, made of, for example, printed circuit board (PCB) material, epoxy, metal or similar material, mounted therebetween. Laser light source 604 generates an output beam of light 607, which impinges on a beam splitting cube 602, such that output signals 623 are transmitted into region 106. Returning light signals from region 106 are transmitted through beam splitting cube 602, through a slit 642 in mask 624 and then through opening 608 in substrate 606. It should be noted that beam splitting cube 602 can be a polarizing beam splitting cube. It should also be noted that, as with the embodiments described above, beam splitting cube 602, or polarizing beam splitting cube 602, need not be a cube. It may be a beam splitting plate or polarizing beam splitting plate tilted at an appropriate angle with respect to the optical path(s). Light beams 625 from slit 642 pass through opening 608 in substrate 606 and are detected by detector 626, which is mounted to the bottom side of substrate 606. In some exemplary embodiments, detector 626 is a surface mount device mounted to the bottom surface of substrate 606. It should be noted that, in some exemplary embodiments, laser light source 604 is one of an array of laser light sources disposed in parallel along an axis directed substantially normal to the page of FIG. 6A. Similarly, polarizing or non-polarizing beam splitting cube or plate 602 can be a single long cube or plate, or multiple cubes or plates, extending along the same axis normal to the page. Similarly, detector 626 can be a single long detector or array of detectors, or multiple detectors or arrays of detectors, extending along the same axis normal to the page.

Referring to FIG. 6B, a laser light source 704 is integrated on or over a substrate 706, with a layer of inert spacing material 705, made of, for example, printed circuit board (PCB) material, epoxy, or other similar material, mounted therebetween. Laser light source 704 generates an output beam of light 707, which impinges on a beam splitting cube 702, such that output signals 723 are transmitted into region 106. Returning light signals from region 106 are transmitted through beam splitting cube 702, through a slit 742 in mask 724. It should be noted that beam splitting cube 702 can be a polarizing beam splitting cube. It should also be noted that, as with the embodiments described above, beam splitting cube 702, or polarizing beam splitting cube 702, need not be a cube. It may be a beam splitting plate or polarizing beam splitting plate tilted at an appropriate angle with respect to the optical path(s). Light beams 725 from slit 742 are detected by detector 726, which is mounted to the top side or surface of second substrate 728. First substrate 706 and second substrate 728 are mechanically supported and properly located with respect to each other by a mounting/spacing support layer 709. Mounting/spacing support layer 709 can be made of, for example, a layer of inert spacing material, made of, for example, printed circuit board (PCB) material, epoxy, metal, or other similar material. The physical configuration of mounting/spacing support layer 709, i.e., dimensions, location, etc., are selected to provide appropriate support and stability among components such as laser light source 704, beam splitting cube 702, first substrate 706, second substrate 728, mask 724 and slit 742, such that the performance requirements of system 700 are met.

It should be noted that, in some exemplary embodiments, laser light source 704 is one of an array of laser light sources disposed in parallel along an axis directed substantially normal to the page of FIG. 6B. Similarly, polarizing or non-polarizing beam splitting cube or plate 702 can be a single long cube or plate, or multiple cubes or plates, extending along the same axis normal to the page. Similarly, detector 726 can be a single long detector or array of detectors, or multiple detectors or arrays of detectors, extending along the same axis normal to the page.

Figure 7:
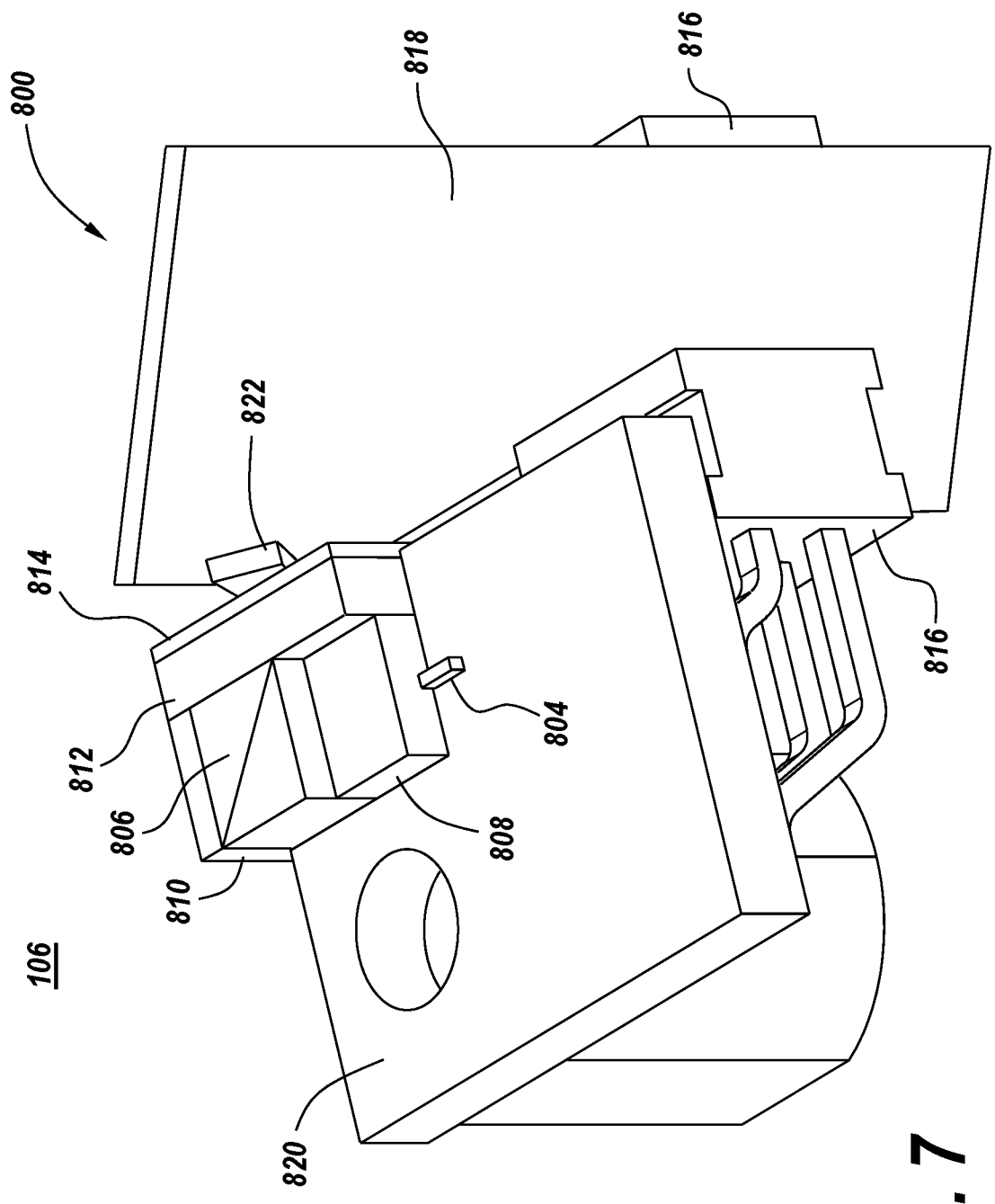
FIG. 7 includes a schematic perspective view illustrating a portion of a scanning LiDAR system, according to some exemplary embodiments.
Figure 8A:
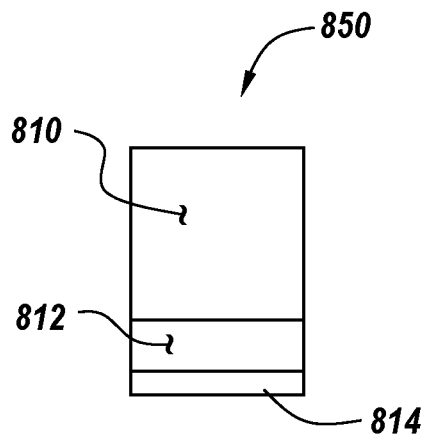
FIG. 8 includes four schematic views, labeled (A), (B), (C), and (D), of a unitary integrated optical element, according to some exemplary embodiments.
Figure 8B:
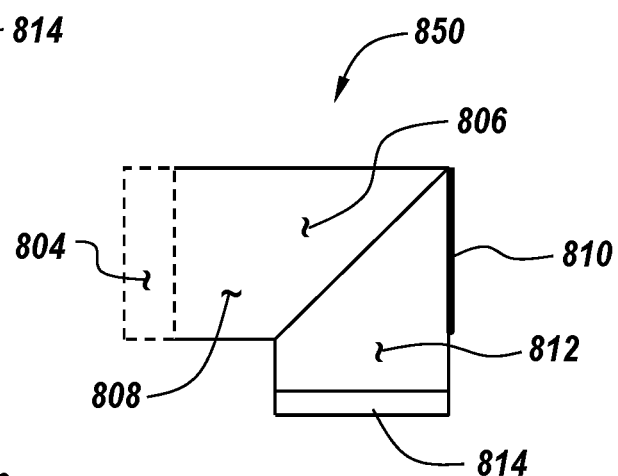
Figure 8C:
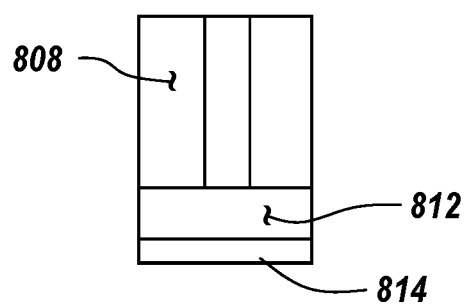
Figure 8D:
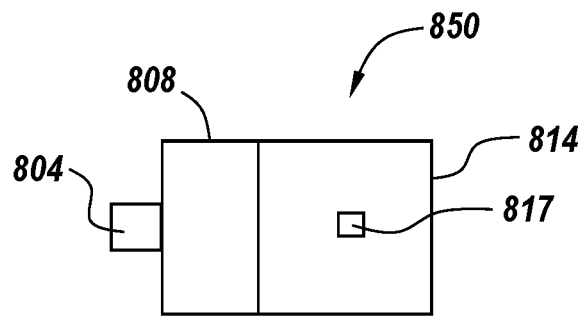

FIG. 7 includes a schematic perspective view illustrating a portion of a scanning LiDAR system 800, according to some exemplary embodiments. Referring to FIG. 7, system 800 includes laser diode source 804 for emitting illuminating light. A fast axis collimating (FAC) lens 808 receives the light from laser diode source 804, collimates the light and passes it to polarizing beam splitting cube 806. Illuminating light which passes through polarizing beam splitting cube 806 may pass through an optional quarter wave plate 810 which converts linearly polarized light into circularly polarized light The illuminating light passing through polarizing beam splitting cube 806 and/or quarter wave plate 810 is scanned into region 106 being monitored. Light returning from region 106 is reflected by polarizing beam splitting cube 806 through slit aperture mask 812. In some exemplary embodiments, slit aperture mask 812 includes a glass substrate with an opaque coating 814 deposited on the glass. Opaque coating 814 is patterned to provide a slit opening or aperture through with returning light passes. This light is received by a photo detector or photo detector array 822.

As illustrated in FIG. 7, optical components including laser diode 804, FAC lens 808, polarizing beam splitting cube 806, quarter wave plate 810, and slit aperture mask 812 are mounted or formed on a first substrate or printed circuit board (PCB) 820. Detector 822 is mounted or formed on a second substrate or PCB 818. First and second PCBs 820 and 818 are spatially supported and fixedly attached to each other and held stationary with respect to each other by a supporting frame element 816. In some exemplary embodiments, PCBs 820, 818 are held substantially perpendicular.

In conventional LiDAR systems, active alignment of optical components is required. This active alignment can be inefficient and time consuming, and, therefore, costly. In contrast, according to the present disclosure, optical components such laser source 804, FAC lens 808, polarizing beam splitting cube 806, quarter wave plate 810 and slit aperture mask 812 can be integrated in a single unitary optical element, which can be manufactured to very close tolerances, such that spatial relationships among the optical elements are precisely, accurately and permanently controlled, thus eliminating the need for active alignment.

FIG. 8 includes four schematic views, labeled (A), (B), (C), and (D), of a unitary integrated optical element 850, according to some exemplary embodiments. Referring to FIG. 8, unitary integrated optical element 850 includes one-piece precision glass optics, which includes laser diode source 804, FAC lens 808, polarizing beam splitting cube 806, slit aperture mask 812, 814 and quarter wave plate 810 in a single precision optical element. It is noted that laser diode source need not be integrated in unitary integrated optical element 850. In alternative embodiments, laser diode source is a separate element, which can be formed on PCB 820, or formed on a separate laser PCB, which is mounted on PCB 820. All of the elements are made to very tight tolerances to provide the desired device alignment. In particular, slit, opening or aperture 817 formed in mask 814 in slit aperture mask 812 is positioned precisely with respect to FAC lens 808 and polarizing beam splitting cube 806 portions of the single unitary optical element 850.

It should be noted that, in some embodiments, mask 814 including the patterned opaque coating providing slit, opening or aperture 817 need not be a separate element 812. Instead, coating 814 and slit, opening or aperture 817 can be formed directly on the surface of polarizing beam splitting cube 806. In this alternative embodiment, referring to FIGS. 7 and 8, slit aperture mask element 812 would be omitted, and coating 814 with slit, opening or aperture 817 would be formed directly on the surface of polarizing beam splitting cube 806.

Figure 9:
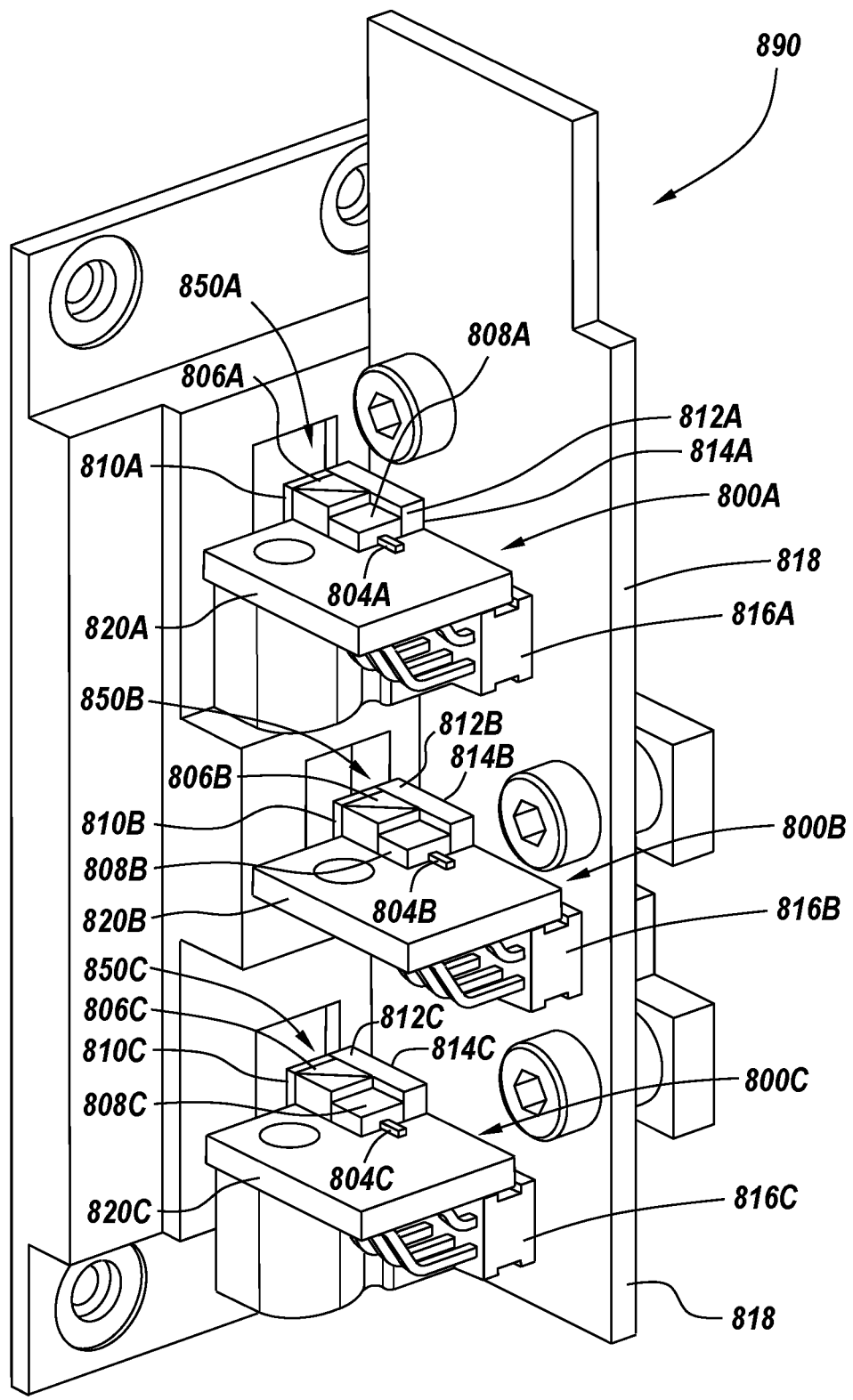
FIG. 9 includes a schematic perspective view of a LiDAR system with a plurality of systems illustrated in FIGS. 7 and 8, according to some exemplary embodiments.

FIG. 9 includes a schematic perspective view of a LiDAR system 890 with a plurality of systems 800 illustrated in FIGS. 7 and 8, according to some exemplary embodiments. Referring to FIG. 9, each system 800 includes the unitary one-piece integrated optic element 850A, 850B, 850C mounted on first substrate or PCB 820A, 820B, 820C. As described above, each integrated optic element 850A, 850B, 850C includes a laser diode source 804A, 804B, 804C; a FAC lens 808A, 808B, 808C; a polarizing beam splitting cube 806A, 806B, 806C; a slit aperture mask 812A, 812B, 812C with a respective patterned mask 814A, 814B, 814C; and an optional quarter wave plate 810A, 810B, 810C. First substrates or PCBs 820A, 820B, 820C and second substrate or PCB 818 are spatially supported and fixedly attached to each other and held stationary with respect to each other by a respective supporting frame element 816A, 816B, 816C. In some exemplary embodiments, PCBs 820A, 820B, 820C are held substantially perpendicular to second substrate or PCB 818.

Figure 10:
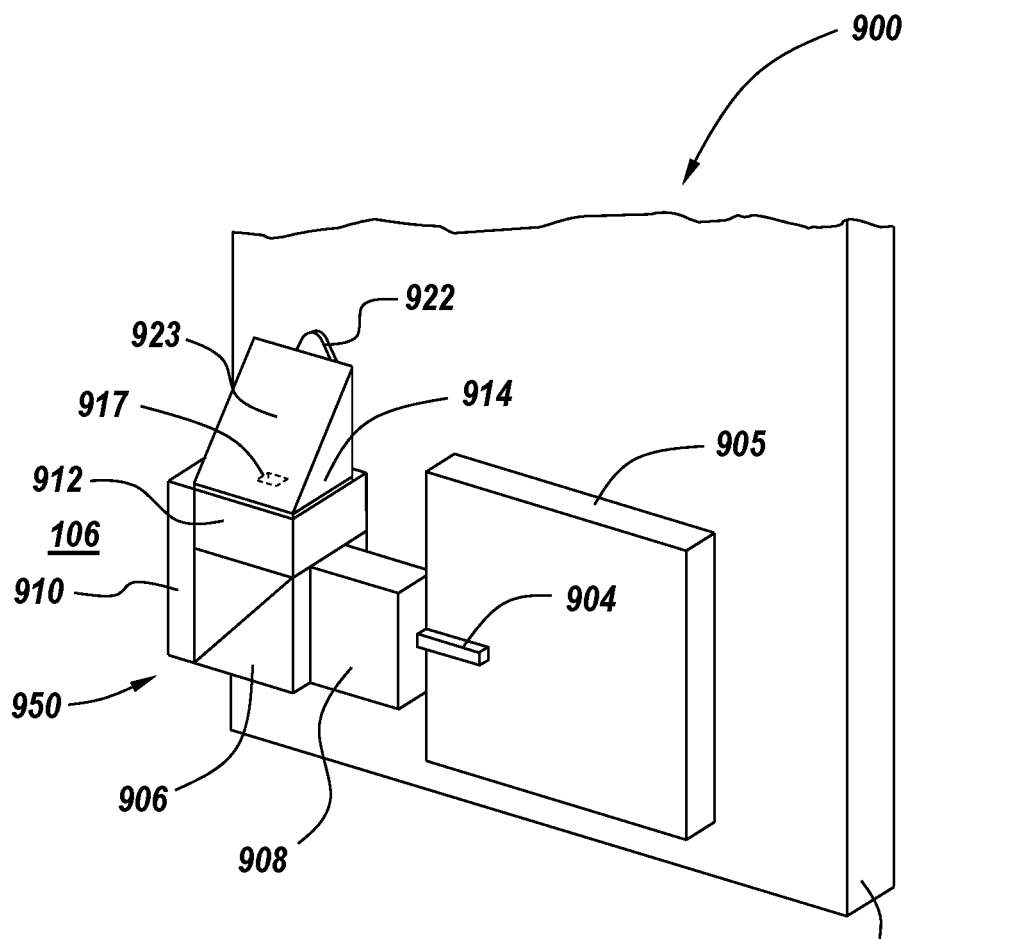
FIG. 10 includes a schematic perspective view illustrating a portion of a scanning LiDAR system, according to some exemplary embodiments.

FIG. 10 includes a schematic perspective view illustrating a portion of another scanning LiDAR system 900, according to some exemplary embodiments. System 900 of FIG. 10 is different from system 800 of FIG. 7 in that, in system 900 of FIG. 10, a single substrate or PCB 920 is used instead of a pair of substrates 818, 820 held perpendicular to each other. This is accomplished in system 900 by the addition of a 45-degree prism 923 added at the optical slit or aperture of slit aperture mask 912. Light passing through slit aperture mask 912 is directed down to the surface of substrate or PCB 920, on which optical detector or array of detectors 922 is mounted.

System 900 includes laser diode source 904 mounted on or in laser PCB 905, which is mounted on substrate or PCB 920. A fast axis collimating (FAC) lens 908 receives the light from laser diode source 904, collimates the light and passes it to polarizing beam splitting cube 906. Illuminating light which passes through polarizing beam splitting cube 806 may pass through an optional quarter wave plate 910 which converts linearly polarized light into circularly polarized light The illuminating light passing through polarizing beam splitting cube 906 and/or quarter wave plate 910 is scanned into region 106 being monitored. Light returning from region 106 is directed by polarizing beam splitting cube 906 through slit aperture mask 912. In some exemplary embodiments, slit aperture mask 912 includes a glass substrate with an opaque coating 914 deposited on the glass. Opaque coating 914 is patterned to provide a slit opening or aperture 917 through with returning light passes. The light passing through slit opening or aperture 917 is reflected by 45-degree prism 923 toward substrate or PCB 920. This light is received by photo detector or photo detector array 922, which is mounted on substrate or PCB 920.

As with the embodiments of FIGS. 7-9, the optical elements of system 900 can be integrated in a single unitary optical element 950, which can be manufactured to very close tolerances, such that spatial relationships among the optical elements are precisely, accurately and permanently controlled, thus eliminating the need for active alignment. Specifically, optical components such as laser diode source 904, FAC lens 908, polarizing beam splitting cube 906, quarter wave plate 910, slit aperture mask 912, and 45-degree prism 923 can be integrated in a single unitary optical element 950. In some exemplary embodiments, unitary integrated optical element 950 includes one-piece precision glass optics, which includes laser diode source 904, FAC lens 908, polarizing beam splitting cube 906, quarter wave plate 910, slit aperture mask 912, and 45-degree prism 923 in a single precision optical element. All of the elements are made to very tight tolerances to provide the desired device alignment. In particular, slit, opening or aperture 917 formed in mask 914 in slit aperture mask 912 is positioned precisely with respect to FAC lens 908 and polarizing beam splitting cube 906 portions of the single unitary optical element 950.

As with the embodiments of FIGS. 7-9, laser diode source 904 need not be integrated in unitary integrated optical element 950. In alternative embodiments, laser diode source 904 is a separate element, which can be formed on PCB 920, or formed on laser PCB 905, which is mounted on PCB 920. Also, as with the embodiments of FIGS. 7-9, in some embodiments, mask 914 including the patterned opaque coating providing slit, opening or aperture 917 need not be a separate element 912. Instead, coating 914 and slit, opening or aperture 917 can be formed directly on the surface of polarizing beam splitting cube 906. In this alternative embodiment, slit aperture mask element 912 would be omitted, and coating 914 with slit, opening or aperture 917 would be formed directly on the surface of polarizing beam splitting cube 906.

Figure 11:
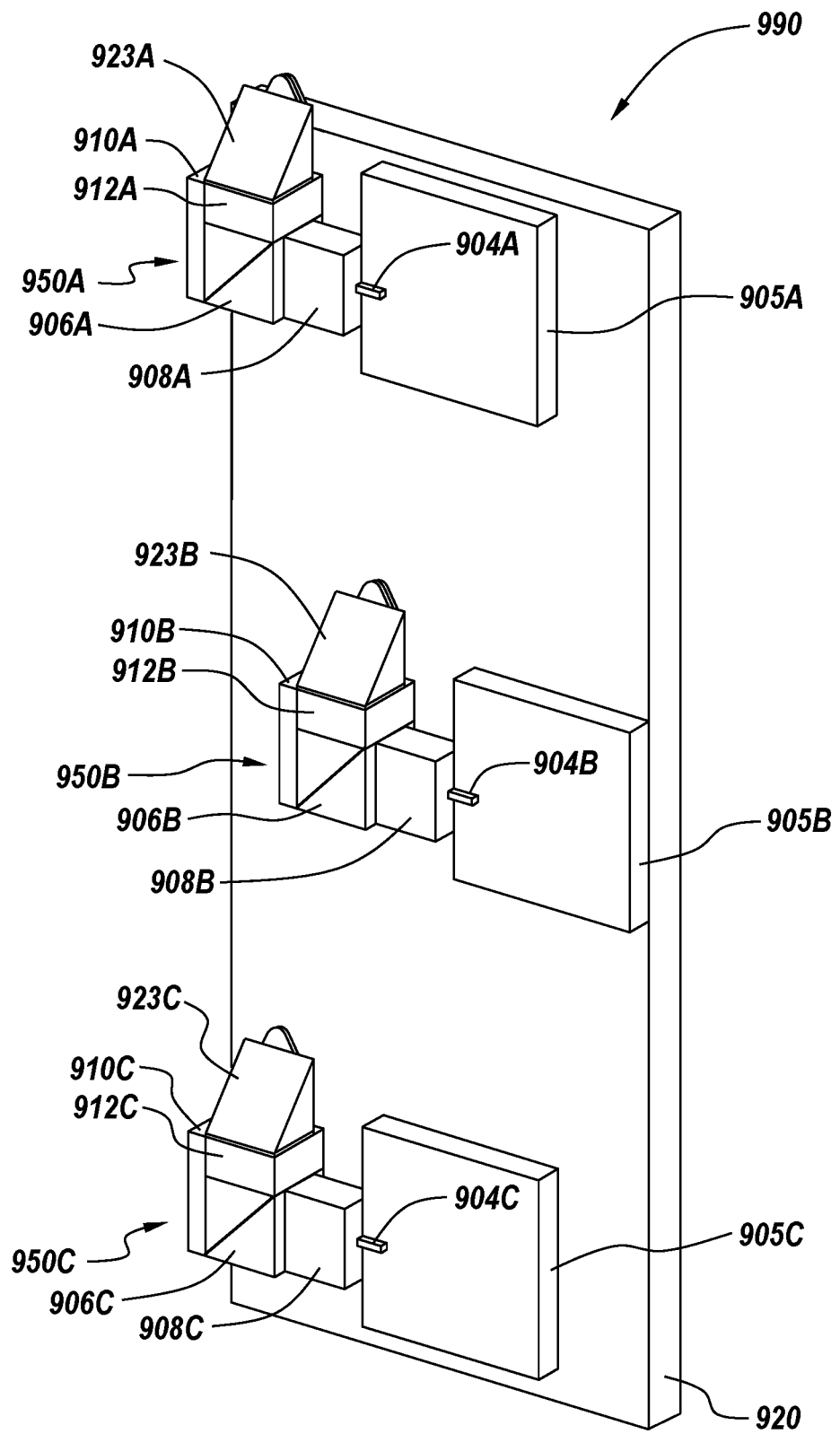
FIG. 11 includes a schematic perspective view of a LiDAR system with a plurality of systems 900 illustrated in FIG. 10, according to some exemplary embodiments.

FIG. 11 includes a schematic perspective view of a LiDAR system 990 with a plurality of systems 900 illustrated in FIG. 10, according to some exemplary embodiments. Referring to FIG. 11, each system 900 includes the unitary one-piece integrated optic element 950A, 950B, 950C mounted on substrate or PCB 920. As described above, each integrated optic element 950A, 950B, 950C includes a laser diode source 904A, 904B, 904C on a respective laser PCB 905A, 905B, 905C; a FAC lens 908A, 908B, 908C; a polarizing beam splitting cube 906A, 906B, 906C; a slit aperture mask 912A, 912B, 912C with a respective patterned mask 914A, 914B, 914C; an optional quarter wave plate 910A, 910B, 910C; and a 45-degree prism 912A, 923B, 923C.

Figure 12:
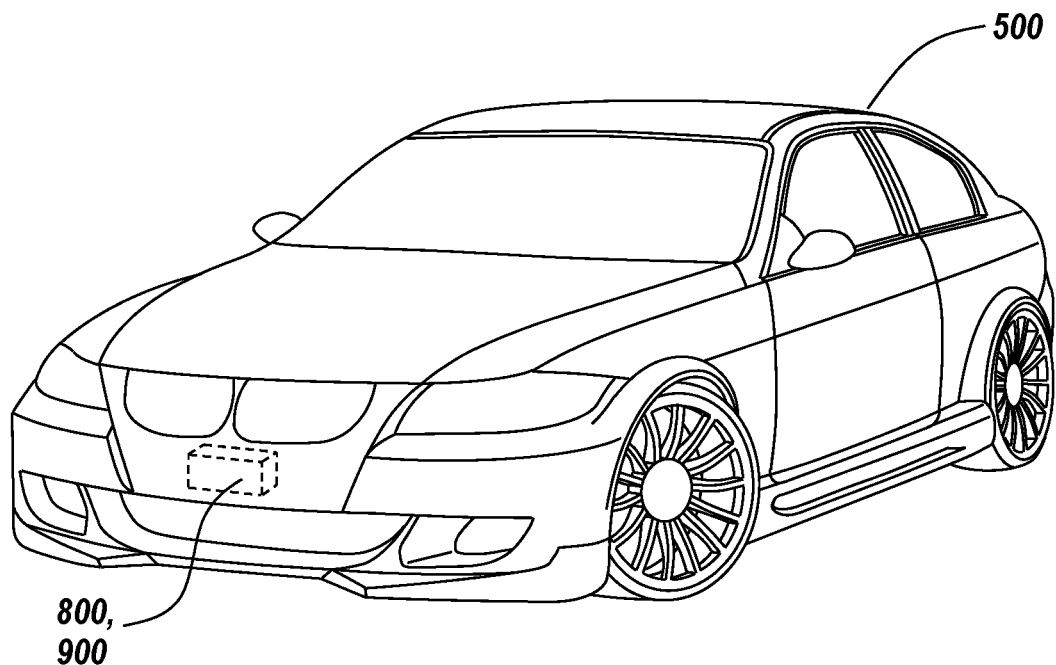
FIG. 12 includes a schematic perspective view of an automobile equipped with one or more scanning LiDAR systems described herein in detail, according to some exemplary embodiments.

FIG. 12 includes a schematic perspective view of an automobile 500, equipped with one or more scanning LiDAR systems 800, 900, described herein in detail, according to exemplary embodiments. Referring to FIG. 12, it should be noted that, although only a single scanning LiDAR system 800, 900 is illustrated, it will be understood that multiple LiDAR systems 800, 900 according to the exemplary embodiments can be used in automobile 500. Also, for simplicity of illustration, scanning LiDAR system 800, 900 is illustrated as being mounted on or in the front section of automobile 500. It will also be understood that one or more scanning LiDAR systems 800, 900 can be mounted at various locations on automobile 500. Also, it will be understood that LiDAR system 800, 900 can be replaced with any of the LiDAR systems described herein. That is, the description of FIG. 12 is applicable to an automobile equipped with any of the embodiments described herein.

Figure 13:
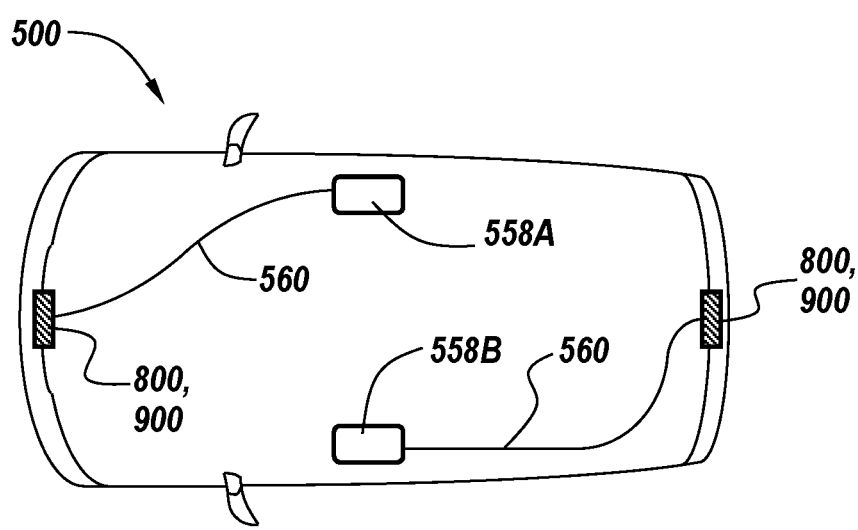
FIG. 13 includes a schematic top view of an automobile equipped with two scanning LiDAR systems, as described herein in detail, according to some exemplary embodiments.

FIG. 13 includes a schematic top view of automobile 500 equipped with two scanning LiDAR systems 800, 900, as described above in detail, according to exemplary embodiments. In the particular embodiments illustrated in FIG. 13, a first LiDAR system 800, 900 is connected via a bus 560, which in some embodiments can be a standard automotive controller area network (CAN) bus, to a first CAN bus electronic control unit (ECU) 558A. Detections generated by the LiDAR processing described herein in detail in LiDAR system 100, 100A can be reported to ECU 558A, which processes the detections and can provide detection alerts via CAN bus 560. Similarly, in some exemplary embodiments, a second LiDAR scanning system 800, 900 is connected via CAN bus 560 to a second CAN bus electronic control unit (ECU) 558B. Detections generated by the LiDAR processing described herein in detail in LiDAR system 800, 900 can be reported to ECU 558B, which processes the detections and can provide detection alerts via CAN bus 560. It should be noted that this configuration is exemplary only, and that many other automobile LiDAR configurations within automobile 500 can be implemented. For example, a single ECU can be used instead of multiple ECUs. Also, the separate ECUs can be omitted altogether. Also, it will be understood that LiDAR system 800, 900 can be replaced with any of the LiDAR systems described herein. That is, the description of FIG. 17 is applicable to an automobile equipped with any of the embodiments described herein.

It is noted that the present disclosure describes one or more scanning LiDAR systems installed in an automobile. It will be understood that the embodiments of scanning LiDAR systems of the disclosure are applicable to any kind of vehicle, e.g., bus, train, etc. Also, the scanning LiDAR systems of the present disclosure need not be associated with any kind of vehicle.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A LiDAR apparatus, comprising:
a first substrate;
a unitary optical element mounted on the first substrate, the unitary optical element comprising:
a fast axis collimator (FAC) lens receiving light from a laser diode source and generating therefrom a collimated light beam,
a polarizing beam splitter optically coupled to the FAC lens, at least a portion of the collimated light beam passing through the polarizing beam splitter to a region being observed by the LiDAR apparatus,
an aperture element optically coupled to the polarizing beam splitter, and
an opaque coating formed on a back side of the aperture element, the opaque coating being patterned to provide a transparent aperture; wherein
at least of portion of light returning to the LiDAR apparatus from the region being observed is directed by the polarizing beam splitter, through the transparent aperture in the opaque coating on the aperture element, to an optical detector.

2. The LiDAR apparatus of claim 1, further comprising a second substrate in fixed spatial relation to the first substrate; wherein, the optical detector is mounted on the second substrate.

3. The LiDAR apparatus of claim 2, wherein the first and second substrates are held in stationary spatial relation with respect to each other by a supporting frame.

4. The LiDAR apparatus of claim 2, wherein the first and second substrates are held in stationary spatial relation substantially perpendicular to each other by a supporting frame.

5. The LiDAR apparatus of claim 1, wherein the unitary optical element further comprises a quarter wave plate optically coupled to the polarizing beam splitter between the polarizing beam splitter and the region being observed.

6. The LiDAR apparatus of claim 1, wherein the unitary optical element is a one-piece precision glass optical element.

7. The LiDAR apparatus of claim 1, wherein the laser diode source is part of the unitary optical element.

8. A LiDAR apparatus, comprising:
a substrate;
a laser diode on a surface of the substrate for outputting light;
a fast axis collimator (FAC) lens on the surface of the substrate for receiving the light and generating therefrom a collimated light beam;
a polarizing beam splitter optically coupled to the FAC lens for receiving the collimated light beam, at least a portion of the collimated light beam passing through the polarizing beam splitter to a region being observed by the LiDAR apparatus;
an aperture element optically coupled to the polarizing beam splitter;
an opaque coating formed on a back side of the aperture element, the opaque coating being patterned to provide a transparent aperture;
a prism on the surface of the substrate for receiving light from the transparent aperture in the opaque coating on the aperture element and directing the received light from the transparent aperture in the opaque coating on the aperture element in a direction toward the surface of the substrate; and
an optical detector optically coupled to the prism; wherein
at least of portion of light returning to the LiDAR apparatus from the region being observed is directed by the polarizing beam splitter, through the transparent aperture in the opaque coating on the aperture element, through the prism to the optical detector.

9. The LiDAR apparatus of claim 8, wherein the optical detector is on the surface of the substrate.

10. The LiDAR apparatus of claim 8, wherein the prism is a 45-degree prism.

11. The LiDAR apparatus of claim 8, wherein the FAC lens, the polarizing beam splitter, and the aperture element are formed as a unitary optical element on the surface of the substrate.

12. The LiDAR apparatus of claim 11, wherein the unitary optical element is a one-piece precision glass optical element.

13. The LiDAR apparatus of claim 11, wherein the prism is also formed as part of the unitary optical element.

14. The LiDAR apparatus of claim 11, wherein the laser diode is also formed as part of the unitary optical element.

15. The LiDAR apparatus of claim 8, further comprising a quarter wave plate optically coupled to the polarizing beam splitter between the polarizing beam splitter and the region being observed.

16. The LiDAR apparatus of claim 15, wherein the quarter wave plate, the FAC lens, the polarizing beam splitter, and the aperture element are formed as a unitary optical element of the surface of the substrate.

17. The LiDAR apparatus of claim 16, wherein the unitary optical element is a one-piece precision glass optical element.

* * * * *

UNITED STATES PATENT AND TRADEMARK OFFICE
CERTIFICATE OF CORRECTION

| | | |
|---|---|---|
| PATENT NO. | : 11,474,218 B2 | Page 1 of 1 |
| APPLICATION NO. | : 16/511432 | |
| DATED | : October 18, 2022 | |
| INVENTOR(S) | : Bernard de Mersseman, Desmond Fleming and Olov Von Hofsten | |

It is certified that error appears in the above-identified patent and that said Letters Patent is hereby corrected as shown below:

On the Title Page

Item (71), delete "Wilmington, DE" and replace it with --Southfield, MI--.

Signed and Sealed this
Twenty-second Day of November, 2022

*Katherine Kelly Vidal*

Katherine Kelly Vidal
*Director of the United States Patent and Trademark Office*